(12) United States Patent
DeFrance

(10) Patent No.: US 7,858,882 B2
(45) Date of Patent: Dec. 28, 2010

(54) CONNECTOR FOR CORE AND STRANDED CABLE

(75) Inventor: Robert V. DeFrance, Poughkeepsie, NY (US)

(73) Assignee: Burndy Technology LLC, Manchester, NH (US)

( * ) Notice: Subject to any disclaimer, the term of this patent is extended or adjusted under 35 U.S.C. 154(b) by 0 days.

(21) Appl. No.: 12/321,679

(22) Filed: Jan. 23, 2009

(65) Prior Publication Data

US 2010/0190389 A1 Jul. 29, 2010

(51) Int. Cl.
  *H02G 15/08* (2006.01)
(52) U.S. Cl. ......................... 174/79; 439/879
(58) Field of Classification Search ............ 174/79, 174/74 R, 84 R, 88 S; 439/879
See application file for complete search history.

(56) References Cited

U.S. PATENT DOCUMENTS

| | | | | |
|---|---|---|---|---|
| 409,181 A | 8/1889 | De Ferranti | ................. | 285/53 |
| 454,181 A | 6/1891 | Stout et al. | ................. | 174/84 S |
| 1,793,293 A | 3/1931 | Varney et al. | ................ | 403/284 |
| 1,886,086 A | 11/1932 | Damon | ........................ | 403/185 |
| 2,148,173 A | 2/1939 | Rogoff | ........................ | 24/126 |
| 2,463,145 A | 3/1949 | Buchanan | ................... | 439/784 |
| 2,554,387 A | 5/1951 | Saul | ............................ | 285/75 |
| 2,902,537 A | 9/1959 | Salvi | ............................ | 174/79 |
| 2,988,727 A | 6/1961 | Berndt | ....................... | 339/273 |
| 3,345,454 A | 10/1967 | Mixon, Jr. | ................. | 174/84 R |
| 3,384,704 A | 5/1968 | Vockroth | ..................... | 174/90 |
| 3,515,794 A | 6/1970 | Beinhaur et al. | ............... | 174/90 |
| 3,681,512 A | 8/1972 | Werner et al. | ............. | 174/84 R |
| 3,761,602 A | 9/1973 | De Sio et al. | ............ | 174/73 SC |
| 3,996,417 A | 12/1976 | Annas | ......................... | 174/90 |
| 4,252,992 A | 2/1981 | Cherry et al. | ................. | 174/90 |
| 4,362,352 A | 12/1982 | Hawkins et al. | ............. | 339/248 |
| 4,453,034 A | 6/1984 | Annas et al. | ................... | 174/79 |
| 4,458,976 A | 7/1984 | Hudson et al. | ........... | 339/248 R |
| 4,752,252 A | 6/1988 | Cherry et al. | ................ | 439/784 |
| 4,895,570 A * | 1/1990 | Larkin | ......................... | 604/411 |
| 5,647,046 A | 7/1997 | Cowen et al. | ................ | 385/136 |
| 6,015,953 A | 1/2000 | Tosaka et al. | ................ | 174/79 |
| 6,491,545 B1 * | 12/2002 | Spiegel et al. | ............... | 439/579 |
| 6,641,177 B1 * | 11/2003 | Pinciaro | ..................... | 285/242 |
| 6,805,596 B2 | 10/2004 | Quesnel et al. | ............. | 439/877 |
| 7,019,217 B2 | 3/2006 | Bryant | ...................... | 174/88 R |
| 7,342,175 B2 | 3/2008 | De France | ................. | 174/84 R |
| 7,348,489 B2 | 3/2008 | Chadbourne | ............... | 174/74 R |
| 7,385,138 B2 | 6/2008 | De France et al. | ......... | 174/84 R |
| 2007/0062718 A1 * | 3/2007 | De France | .................. | 174/84 C |
| 2007/0066153 A1 | 3/2007 | De France et al. | .......... | 439/877 |
| 2008/0176461 A1 | 7/2008 | Waltz | .......................... | 439/784 |
| 2008/0233787 A1 | 9/2008 | Geibel et al. | ................ | 439/312 |

* cited by examiner

*Primary Examiner*—Neil Abrams
*Assistant Examiner*—Phuong Nguyen
(74) *Attorney, Agent, or Firm*—Harrington & Smith

(57) ABSTRACT

An electrical connector including an end member configured to connect the electrical connector to another member; and jaw segments. The jaw segments are configured to be arranged relative to one another to directly contact a core of a core and stranded (C-S) cable. Each of the jaw segments are configured to contact a different outer perimeter segment around the core to combine to substantially surround a portion of the core. The jaw segments are mounted directly with the end member at an interlocking connection of the jaw segments directly with the end member.

21 Claims, 8 Drawing Sheets

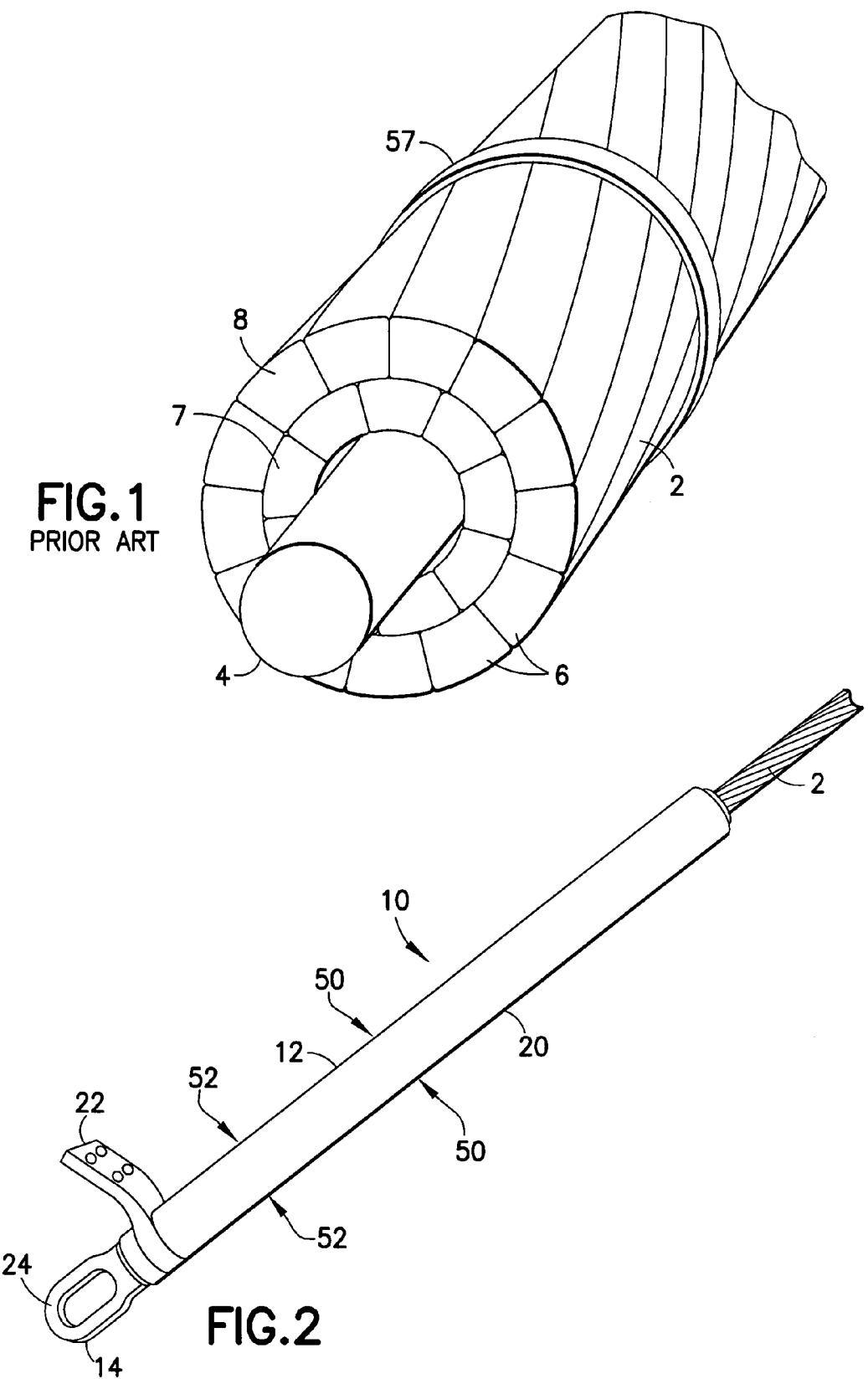

CONNECTOR FOR CORE AND STRANDED CABLE

BACKGROUND OF THE INVENTION

1. Field of the Invention

The invention relates to an electrical connector and, more particularly, to an electrical connector for a core and stranded (C-S) cable.

2. Brief Description of Prior Developments

Core and stranded (C-S) cables are know, such as an Aluminum Conductor Steel Reinforced (ACSR) cable, an Aluminum Conductor Composite Core (ACCC) cable, and an Aluminum Conductor Steel Supported (ACSS) cable for example. As described in U.S. Pat. No. 7,385,138 B2, which is hereby incorporated by reference in its entirety, such cables have a core and strands of electrically conductive metal wrapped around the core. The core functions as a support to allow the cable to be supported over an extended length from opposite ends, such as in overhead high tension lines used in high voltage power distribution networks. The metal conductor stands function as the electrical conductors.

Electrical connectors are used to mechanically and electrically connect the C-S cables. Examples of electrical connectors for C-S cables are described in U.S. Pat. Nos. 6,805,596, 6,015,953 and 7,019,217 B2 for example. Screw-on inner sleeve type of electrical connectors prevent excessive compression on a composite core of a ACCC cable which could otherwise damage the core. However, connectors having screw-on inner sleeves can be labor intensive to install.

There is a desire to provide a C-S cable connector which does not have a screw-on type of inner sleeve, but which nonetheless prevents excessive compression of a composite core or steel core of a C-S cable.

SUMMARY

The following summary is merely intended to be exemplary. The summary is not intended to limit the scope of the claimed invention.

In accordance with one aspect of the invention, an electrical connector is provided including an end member configured to connect the electrical connector to another member; and jaw segments. The jaw segments are configured to be arranged relative to one another to directly contact a core of a core and stranded (C-S) cable. Each of the jaw segments are configured to contact a different outer perimeter segment around the core to combine to substantially surround a portion of the core. The jaw segments are mounted directly with the end member at an interlocking connection of the jaw segments directly with the end member.

In accordance with another aspect of the invention, an electrical connector is provided comprising an end member, jaw segments, and a first sleeve. The end member is configured to connect the electrical connector to another member. The jaw segments are configured to be arranged relative to one another to directly contact a core of a core and stranded (C-S) cable. Each of the jaw segments are configured to contact a different outer perimeter segment of the core to combine to substantially surround a portion of the core. The first sleeve directly contacts the jaw segments and surrounding a majority of the jaw segments. The first sleeve is configured to keep the jaw segments together. The electrical connector comprises a connection of the jaw segments directly with the end member. The connection comprises the first sleeve not being directly attached to the end member.

In accordance with another aspect of the invention, a method is provided comprising arranging jaw segments around an end of a core of a core and stranded (C-S) cable, wherein the jaw segments directly contact different outer perimeter segments of the core to substantially surround a portion of the core; connecting the jaw segments directly to an end member in forming an electrical connector, wherein the end member is configured to connect the electrical connector to another member; and connecting a first sleeve directly to the jaw segments. The first sleeve surrounds the jaw segments along a majority of length of the jaw segments to retain the jaw segments together. The first sleeve does not directly contact the end member.

In accordance with another aspect of the invention, a method of manufacturing a jaw segment of an electrical connector for a core and stranded (C-S) cable is provided comprising forming a shaft section with a slot configured to have an end of the core located in the slot directly against the shaft section; and forming an interlock section at a rear end of the shaft section. The interlock section comprises a recessed seat. The recessed seat is sized and shaped to receive an interlock head of an end member of the electrical connector. The interlock head is located at an end of a smaller size neck of the end member. The interlock section comprises a slot extending from the recessed seat to a rear side of the jaw segment which is sized and shaped to receive a portion of the neck of the end member therein.

BRIEF DESCRIPTION OF THE DRAWINGS

The foregoing aspects and other features of the invention are explained in the following description, taken in connection with the accompanying drawings, wherein:

FIG. 1 is a perspective view of an end of a C-S cable;

FIG. 2 is a side view of an assembly comprising features of the invention;

DETAILED DESCRIPTION OF EMBODIMENT

Figure 3:
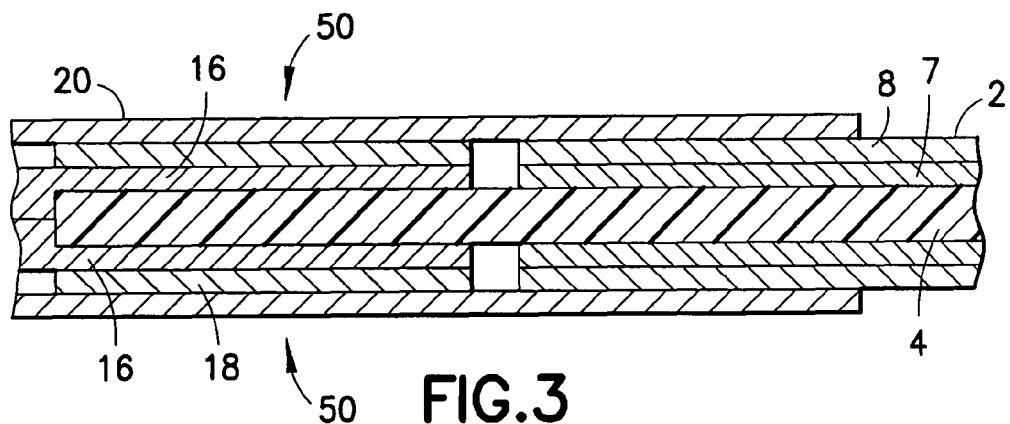
FIG. 3 is a partial cross sectional view of the assembly shown in FIG. 2.

Referring to FIG. 1, there is shown a perspective view of an end of an Aluminum Conductor Composite Core (ACCC) cable 2. The ACCC cable incorporates a light-weight advanced composite core 4, such as a carbon composite, around which conductor wires or stands 6, such as made of aluminum, are wrapped. In the embodiment shown, the wires 6 include inner strands 7 surrounded by outer strands 8. A cable tie 57 is used to keep the stands 8 from unwrapping at the end of the cable. ACCC cables, as opposed to C-S cables having steel cores, are lighter and have greater current carrying capacity, allowing more power to flow in existing rights-of-way. ACCC (Aluminum Conductor Composite Core) cables can double the current carrying capacity over existing C-S transmission and distribution cable and can dramatically increase system reliability by virtually eliminating high-temperature sag.

Referring also to FIG. 2, a cable and connector assembly 10 is shown incorporating features of the invention. Although the invention will be described with reference to the example embodiment shown in the drawings, it should be understood that the invention can be embodied in many alternate forms of embodiments. In addition, any suitable size, shape or type of elements or materials could be used.

The assembly 10 includes the cable 2 and an electrical connector 12. In this embodiment the connector 12 is a dead end connector adapted to mechanically connect the end of the cable 2 to another member, such as a transmission tower. In alternate embodiments, the connector could comprise any suitably connector function, such as a splice connector for example.

Referring also to FIG. 3, the connector 12 generally comprises a dead end connector member 14 (see FIGS. 1 and 7), a jaw assembly comprising jaw segments 16, an inner sleeve 18 and an outer sleeve 20. The dead end connector member 14 forms an end member of the connector. However, in an alternate embodiment, such as a splice electrical connector, the end member might be part of an assembly to connect to another cable. The rear end of the end member 14 has a eyelet section 24 to mechanically connect to another member, such as a transmission tower. In the embodiment shown the outer sleeve 20 comprises an integral tap or connection plate 22 for electrically connecting a connector of another cable assembly (not shown) to the assembly 10. However, the connection plate 22 need not be provided.

Figure 4:
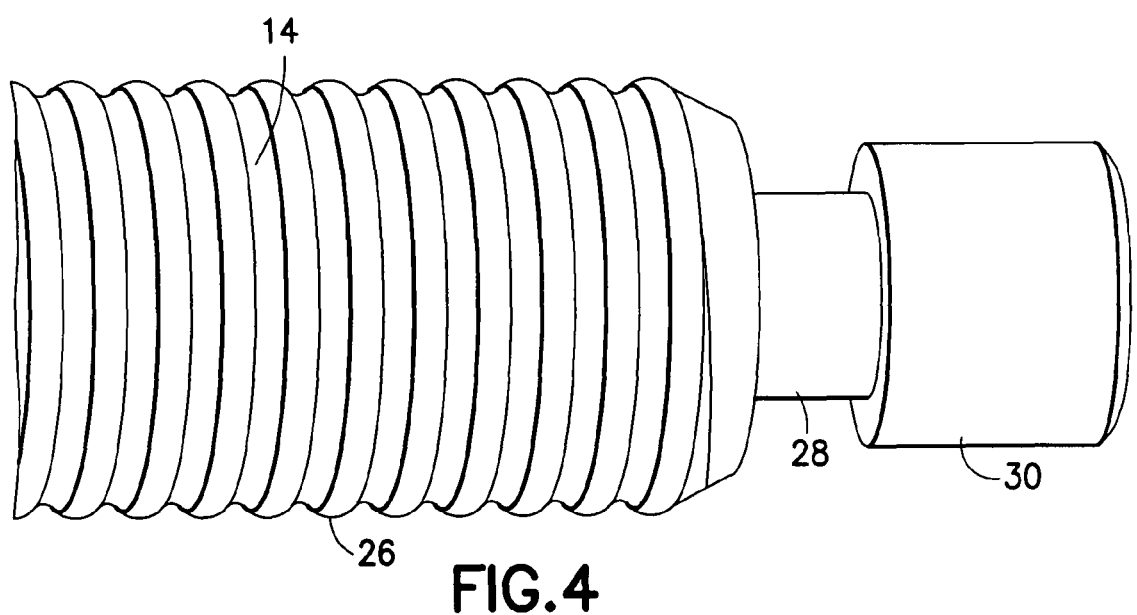
FIG. 4 is a side view of the front end of the end member shown in FIG. 2.

Referring also to FIG. 4, the front end of the end member 14 comprises a ridge section 26, a neck 28 and a head 30. Preferably, the end member 14 is a one-piece metal member, such as steel or aluminum. The neck 28 is smaller than the head 30.

Figure 5:
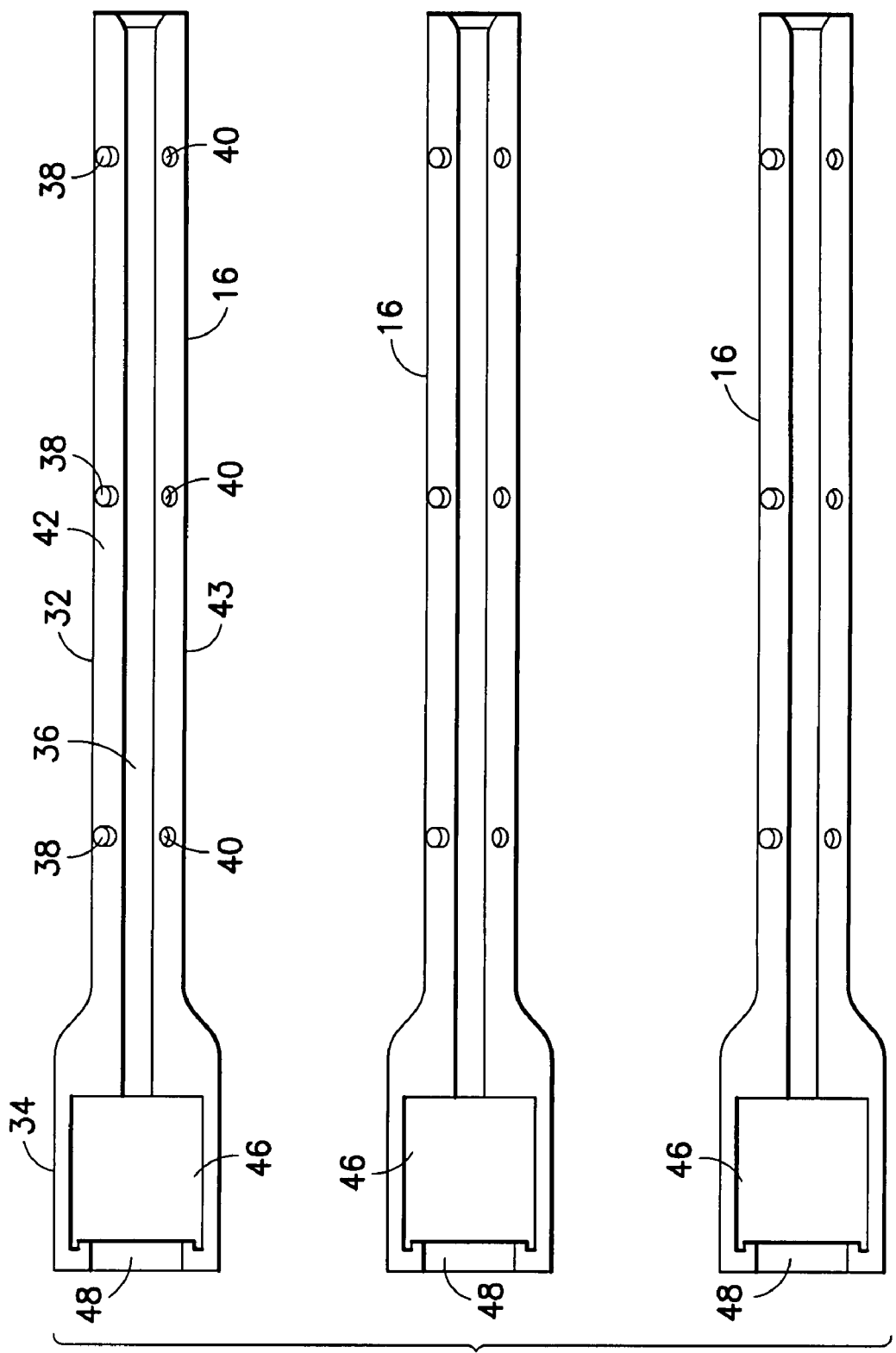
FIG. 5 is a top plan view of three jaw segments used to form the jaw assembly shown in FIG. 3.

Referring also to FIG. 5, the jaw assembly comprises three of the jaw segments 16. However, in alternate embodiments more or less than three jaw segments could be provided. In this embodiment the jaw segments 16 are identical to each other. However, in alternate embodiments one or more of the jaw segments might not be identical. Each jaw segment 16 is preferably comprised of metal, such as cast metal for example. Each jaw segment 16 comprises a shaft section 32 and an interlock section 34 at the rear end of the shaft section 32. The shaft section 32 has a slot or channel 36 which is sized and shaped to receive a portion of the core 4 therein. Angled sides 42, 43 of the shaft section, extending from the slot 36, have projections 38 and holes 40. The angled sides 42, 43 are sized and shaped to be located against the angled sides of the adjacent jaw segments. The projections 38 and holes 40 of the jaw segments interlock to align the jaw segments 16 relative to one another on the core 4 before final assembly.

The interlock section 34 of each jaw segment comprises a recessed seat 46. The three recessed seats 34, when the three jaw segments are assembled, combine to form a pocket which is sized and shaped to hold the head 30 of the end member 14 therein. The interlock section 34 of each jaw segment 16 comprises a slot 48 extending from the recessed seat 46 to a rear side of the jaw segment. The slot 48 is sized and shaped to receive a portion of the neck 28 of the end member 14 therein.

Figure 6:
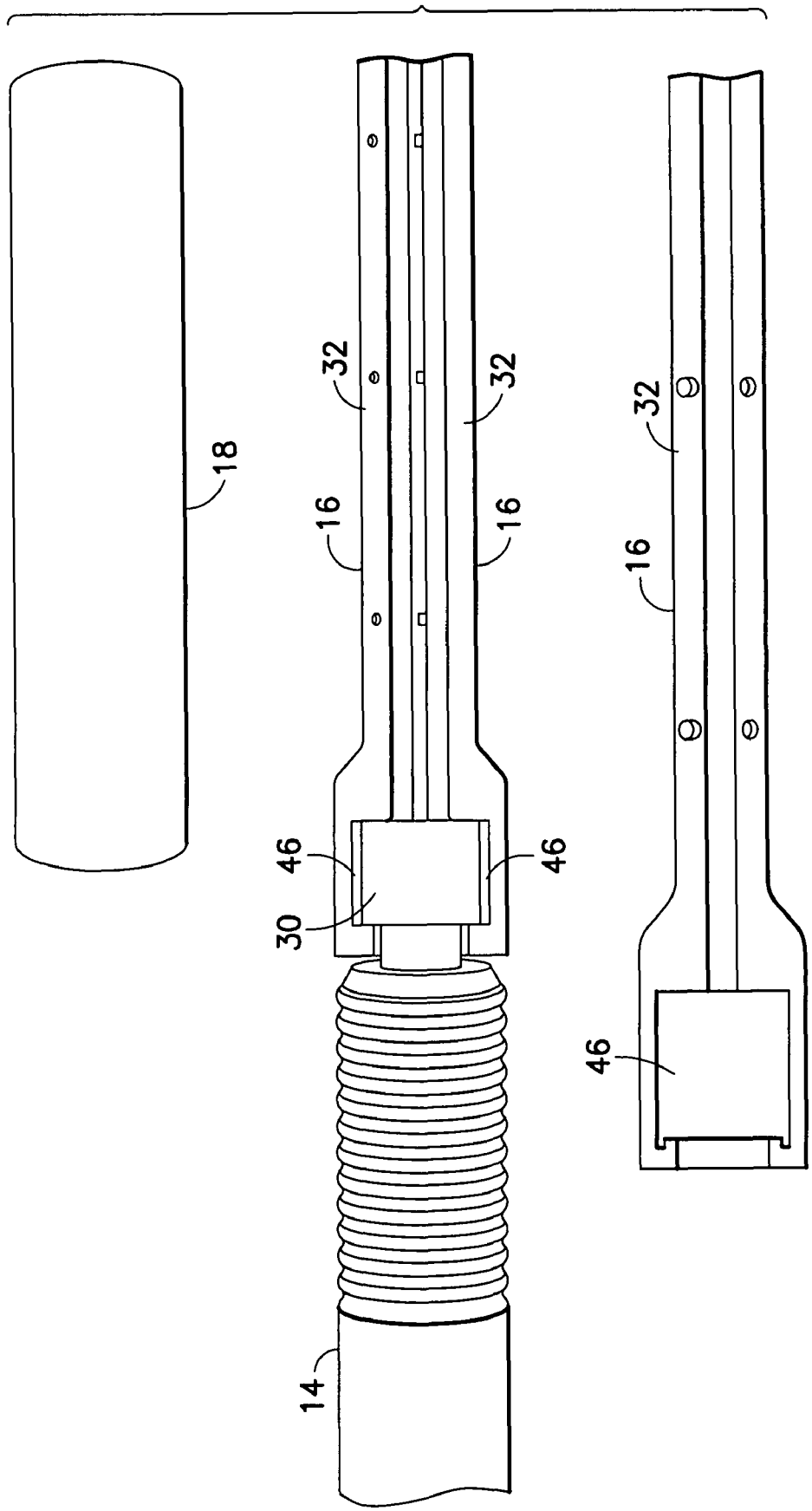
FIG. 6 is an exploded side view of components of the assembly shown in FIG. 3.
Figure 7:
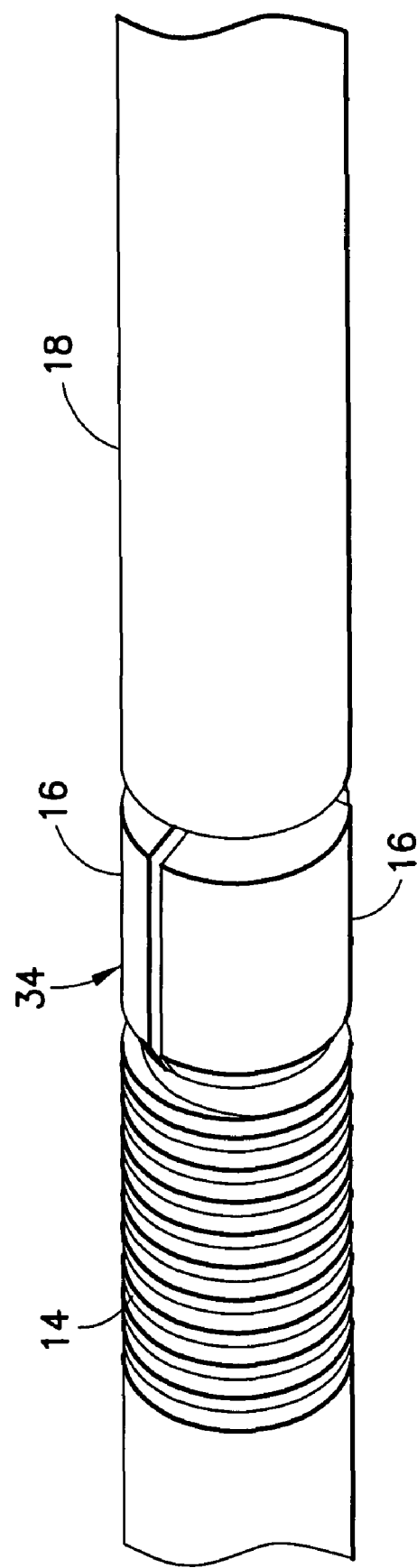
FIG. 7 is a perspective view of the components shown in FIG. 6 is an assembled position as a subassembly.

The inner sleeve 16 is preferably a one piece metal member, such as comprised of steel. The inner sleeve 16 has a general tube shape with an inner channel that is sized and shaped to receive the three shaft sections 32 therein. Referring also to FIG. 6, two of the jaw segments 16 are shown aligned together and receiving the head 30 of the end member 14. The third jaw segment is then aligned with the other two jaw segments and the inner sleeve 18 is slid onto the shaft sections 32 at the front end of the jaw segments. With the inner sleeve 18 slid onto the shaft sections 32, the jaw segments 16 are retained together and the head 30 of the end member 14 is locked in the pocket formed by the recessed seats 46. This subassembly is shown in FIG. 7. The size of the section formed by the interlock sections 34, relative to the hole through the inner sleeve 18, prevents the jaw assembly from sliding out of the front of the inner sleeve.

Referring back to FIGS. 3 and 1, the outer sleeve 20 is then slid onto the inner sleeve 18 and the end member 14. The outer sleeve 20 is compressed or crimped onto the inner sleeve as indicated by arrows 50. The outer sleeve 20 is compressed or crimped onto the end member 14 at the ridge section 26 as indicated by arrows 52. This mechanically connects the outer sleeve 20 to the inner sleeve 18, and the outer sleeve 20 to the end member 14. Thus, the jaw assembly is captured in the inner sleeve 18, and the inner sleeve 18 is mechanically connected to the end member 14 by the outer sleeve 20. The inner sleeve 18 is not directly connected to the end member 14. It is indirectly connected to the end member by the outer sleeve; merely to prevent the inner sleeve from longitudinally moving away from the end member 14 any great distance. The jaw assembly is interlocked directly to the end member 14 by the interlock connection of the head 30 in the pocket formed by the recessed seats 46. This interlock connection prevents the jaw assembly from longitudinally moving away from the end member when the core 4 is under tension.

The outer sleeve 20 can be crimped or compressed onto the strands 6 for a good electrical connection between the strands 6 and the outer sleeve 20. An additional inner sleeve could be provided between the strands 6 and the outer sleeve 20 to prevent excessive compression on the core 4.

Figure 8:
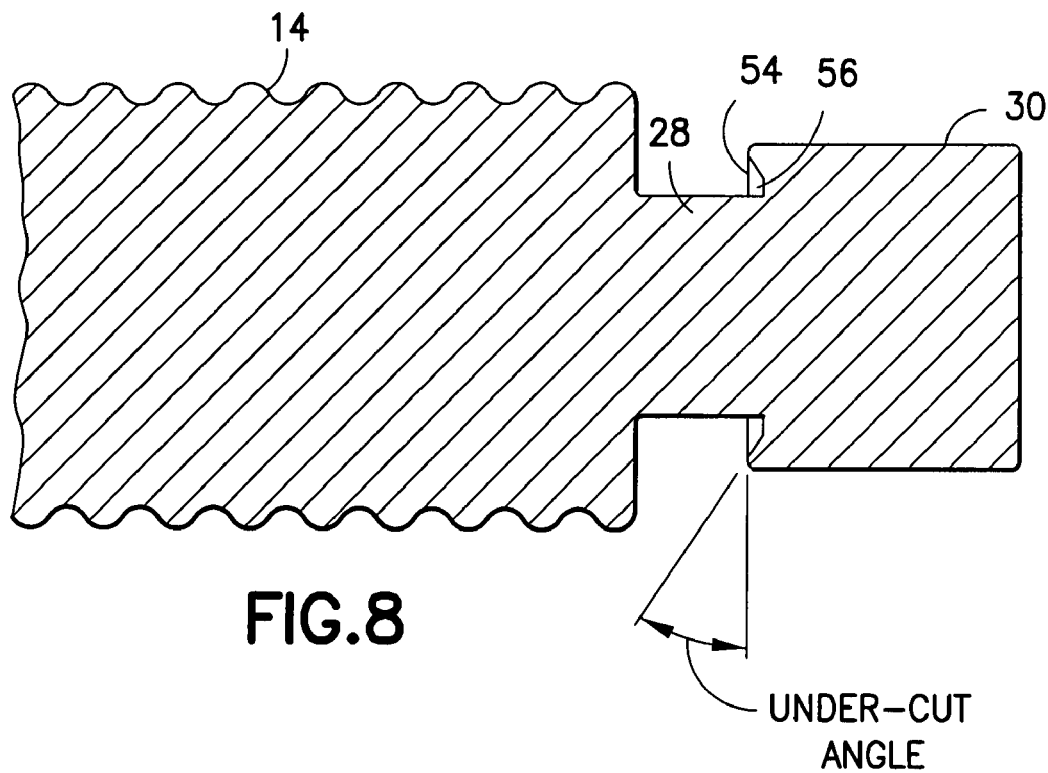
FIG. 8 is an enlarged partial cross sectional view of the end of the connector member shown in FIG. 4.
Figure 9:
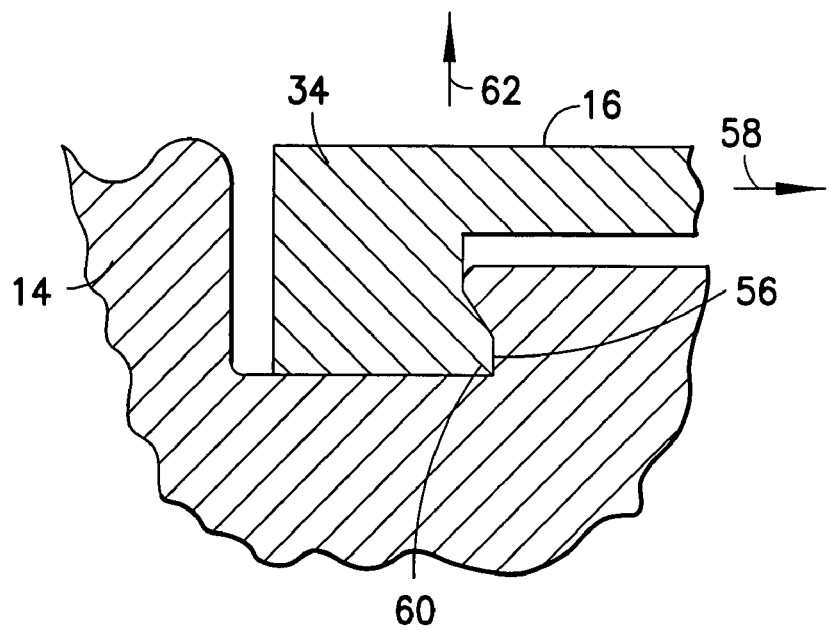
FIG. 9 is an enlarged partial cross sectional view of the end of the connector member and the end of one of the jaw segments connected to each other.

Referring also to FIG. 8, in the example embodiment shown, the head 30 of the connector member 14 has an end 54 at the neck 28 with a groove 56. The groove 56 has an angled surface to form an under-cut angle. The under-cut angle functions as a wedge with the interlock sections 34 of the jaw segments 16. As seen in FIG. 9, when the wedges 16 are pulled in direction 58 by tension on cable 2, the projections 60 on the ends of the interlock sections 34 prevent the interlock sections 34 from bowing out in direction 62 away from the head 30.

Figure 10:
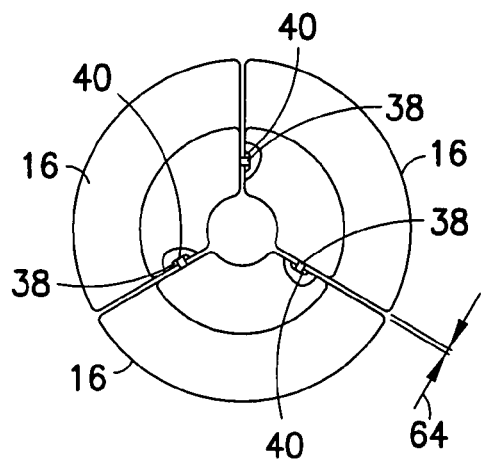
FIG. 10 is an end view showing the three jaw segments initially assembled with each other.
Figure 11:
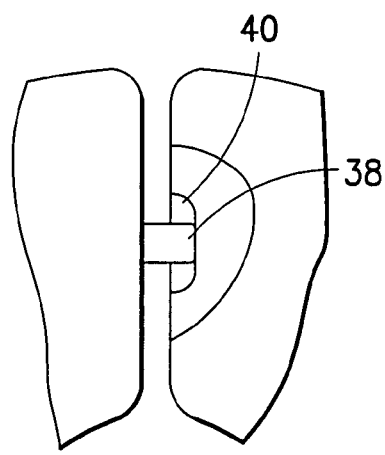
FIG. 11 is an enlarged view showing location of one of the projection into a hole of the jaw segments shown in FIG. 10.

Referring also to FIGS. 10 and 11, when the jaw segments 16 are initially assembled, the projections 38 extend into the holes 40. In this example embodiment the holes 40 are shallower than the projections 38. This forms a gap 64. The holes 40 are preferably counter-bores defined by the angled sides 42, 43 of respective jaw segments. As shown in FIG. 11, the counter-bores 40 individually receive one of the respective projections 38 such that the jaws segments are uniformly spaced apart during pre-installation.

Figure 12:
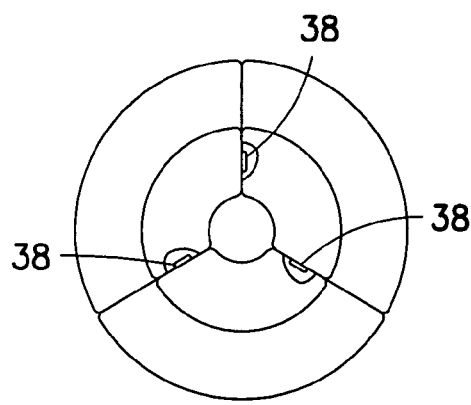
FIG. 12 is an end view similar to FIG. 10 after final connection of the jaw segments with each other.
Figure 13:
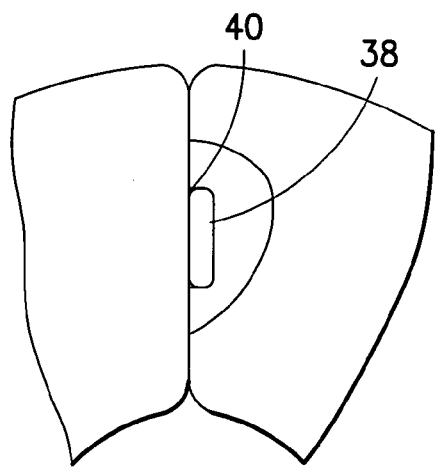
FIG. 13 is an enlarged view similar to FIG. 11 after final connection of the jaw segments with each other as shown in FIG. 12.

Referring also to FIGS. 12 and 13, during installation, the projections 38 are driven further into the counter-bores 40. The projections 38 can mushroom or otherwise yield during compression, such as during installation of the inner steel sleeve 18 over the jaws segments 16. The interrelationship between the projections 38 and the holes/counter-bores 40 provides a controlled, uniform gap between the jaws segments and a graduated, uniform compression of the jaws segments with respect to an adjacent jaws segment. The gap 64 can reduce to zero.

Figure 14:
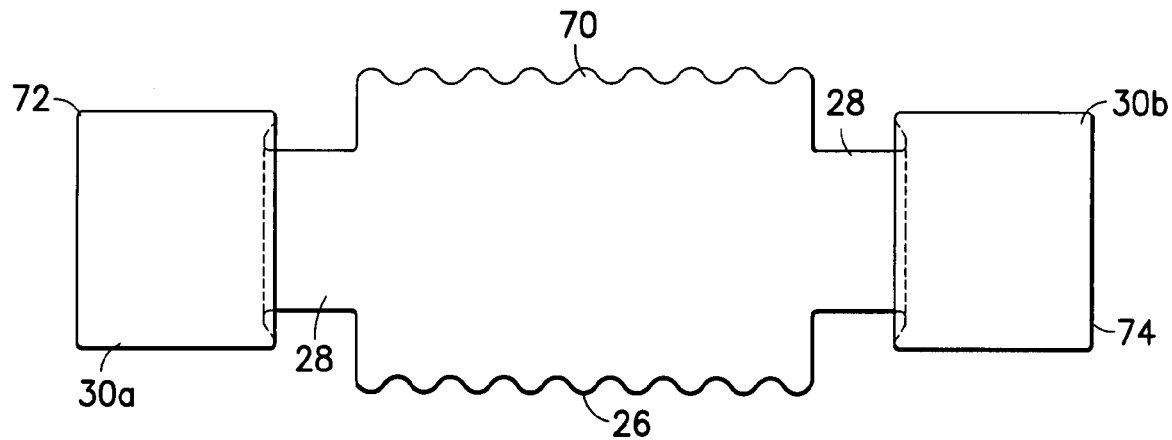
FIG. 14 is a side view of a connector member for use in a splice connection.
Figure 15:
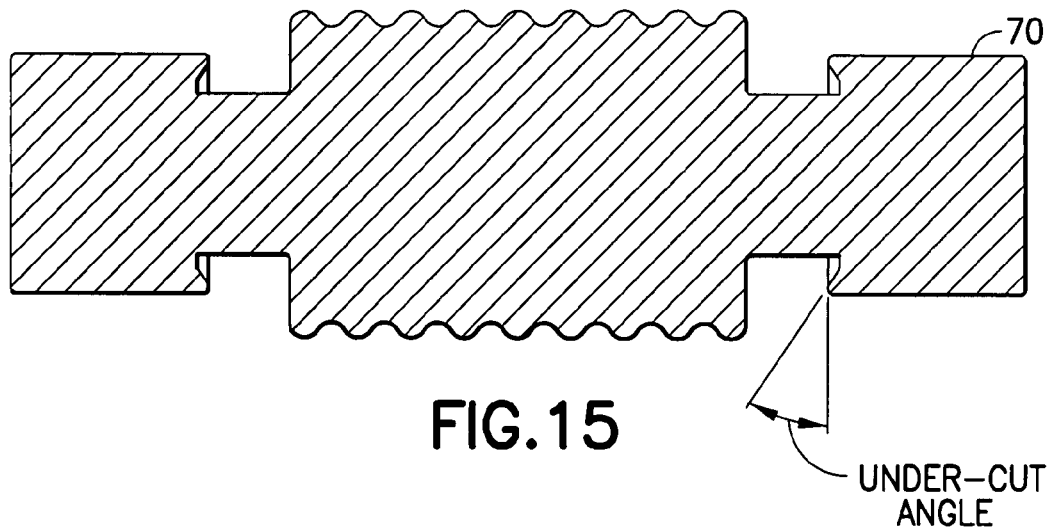
FIG. 15 is a cross sectional view of the connector member shown in FIG. 14.

Referring also to FIGS. 14 and 15, a connector member 70 is show for use in making a splice connection between two of the cables 2. Thus, a first end 72 having a first head 30a would receive a first set of the jaw segments 16, and a second end 74 having a second head 30b would receive a second set of the jaw segment 16; orientated reverse to the first set.

It should be understood that the foregoing description is only illustrative of the invention. Various alternatives and modifications can be devised by those skilled in the art without departing from the invention. For example, features recited in the various dependent claims could be combined with each other in any suitable combination(s). In addition, features from different embodiments described above could be selectively combined into a new embodiment. Accordingly, the invention is intended to embrace all such alternatives, modifications and variances which fall within the scope of the appended claims.

What is claimed is:

1. An electrical connector comprising:
an end member configured to connect the electrical connector to another member; and
jaw segments configured to be arranged relative to one another to directly contact a core of a core and stranded (C-S) cable, wherein each of the jaw segments are configured to contact a different outer perimeter segment around the core to combine to substantially surround a portion of the core, and wherein the jaw segments are mounted directly with the end member at an interlocking connection of the jaw segments directly with the end member.

2. An electrical connector as in claim 1 wherein the interlocking connection comprises each of the jaw segments having a rear end recessed seat which combine to form a pocket, wherein a front end head of the end member is captured in the pocket.

3. An electrical connector as in claim 1 wherein the end member comprises a front end head connected to a rest of the end member by a relatively smaller neck, wherein the interlocking connection comprises the front end head being located in a pocket formed by the jaw segments.

4. An electrical connector as in claim 1 further comprising a first sleeve surrounding shaft sections of the jaw segments.

5. An electrical connector as in claim 4 further comprising a second sleeve surrounding the first sleeve and a portion of the end member, wherein the second sleeve is compressed onto the first sleeve and the end member.

6. An electrical connector as in claim 1 wherein each jaw segment comprises a shaft section with a slot configured to have an end of the core located in the slot directly against the shaft section.

7. An electrical connector as in claim 6 wherein the shaft section comprises projections and holes on opposite sides configured to mate with projections and holes of adjacent ones of the jaw segments.

8. An electrical connector as in claim 6 wherein each jaw segment comprises an interlock section at a rear end of the shaft section, wherein the interlock section is larger in cross section than the shaft section and comprises a rear end recessed seat configured to receive a front end head of the end member.

9. An electrical connector comprising:
an end member configured to connect the electrical connector to another member; and
jaw segments configured to be arranged relative to one another to directly contact a core of a core and stranded (C-S) cable, wherein each of the jaw segments are configured to contact a different outer perimeter segment around the core to combine to substantially surround a portion of the core, and wherein the jaw segments are mounted directly with the end member at an interlocking connection of the jaw segments directly with the end member,
wherein each jaw segment comprises a shaft section with slot configured to have an end of the core located in the slot directly against the shaft section,
wherein each jaw segment comprises an interlock section at a rear end of the shaft section, wherein the interlock section is larger in cross section than the shaft section and comprises a rear end recessed seat configured to receive a front end head of the end member,
wherein the interlock section comprises a slot extending from the recessed seat to a rear side of the jaw segment which is sized and shaped to receive a portion of a neck of the end member therein.

10. An electrical connector comprising:
an end member configured to connect the electrical connector to another member;
jaw segments configured to be arranged relative to one another to directly contact a core of a core and stranded (C-S) cable, wherein each of the jaw segments are configured to contact a different outer perimeter segment of the core to combine to substantially surround a portion of the core; and
a first sleeve directly contacting the jaw segments and surrounding a majority of the jaw segments, wherein the first sleeve is configured to keep the jaw segments together,
wherein the electrical connector comprises a connection of the jaw segments directly with the end member, and wherein the connection comprises the first sleeve not being directly attached to the end member.

11. An electrical connector as in claim 10 further comprising a second sleeve surrounding the first sleeve and a portion of the end member, wherein the second sleeve is compressed onto the first sleeve and the end member.

12. An electrical connector as in claim 10 wherein the connection comprises each of the jaw segments having a rear end recessed seat which combine to form a pocket, wherein a front end head of the end member is captured in the pocket.

13. An electrical connector as in claim 10 wherein each jaw segment comprises a shaft section with a slot configured to have an end of the core located in the slot directly against the shaft section.

14. An electrical connector as in claim 13 wherein the shaft section comprises projections and holes on opposite sides configured to mate with projections and holes of adjacent ones of the jaw segments.

15. An electrical connector as in claim 13 wherein each jaw segment comprises an interlock section at a rear end of the shaft section, wherein the interlock section is larger in cross section than the shaft section and comprises a rear end recessed seat configured to receive a front end head of the end member.

16. An electrical connector as in claim 15 wherein the interlock section comprises a slot extending from the recessed seat to a rear side of the jaw segment which is sized and shaped to receive a portion of a neck of the end member therein.

17. A method comprising:
   arranging jaw segments around an end of a core of a core and stranded (C-S) cable, wherein the jaw segments directly contact different outer perimeter segments of the core to substantially surround a portion of the core;
   connecting the jaw segments directly to an end member in forming an electrical connector, wherein the end member is configured to connect the electrical connector to another member; and
   connecting a first sleeve directly to the jaw segments, wherein the first sleeve surrounds the jaw segments along a majority of length of the jaw segments to retain the jaw segments together, and wherein the first sleeve does not directly contact the end member.

18. A method as in claim 17 further comprising connecting a second sleeve comprising compressing the second sleeve to the end member and to the first sleeve to thereby indirectly connect the first sleeve to the end member.

19. A method as in claim 18 wherein connecting the jaw segments directly to an end member comprises forming an interlocking engagement of the jaw segments with the end member.

20. A method as in claim 19 wherein forming the interlocking engagement comprises receiving a head section of the end member in a pocket formed by the jaw segments.

21. A method of manufacturing a jaw segment of an electrical connector for a core and stranded (C-S) cable, the method comprising:
   forming a shaft section with a slot configured to have an end of the core located in the slot directly against the shaft section;
   forming an interlock section at a rear end of the shaft section, wherein the interlock section comprises a recessed seat, wherein the recessed seat is sized and shaped to receive an interlock head of an end member of the electrical connector, wherein the interlock head is located at an end of a smaller size neck of the end member, and wherein the interlock section comprises a slot extending from the recessed seat to a rear side of the jaw segment which is sized and shaped to receive a portion of the neck of the end member therein.

* * * * *

UNITED STATES PATENT AND TRADEMARK OFFICE
CERTIFICATE OF CORRECTION

| | | |
|---|---|---|
| PATENT NO. | : 7,858,882 B2 | |
| APPLICATION NO. | : 12/321679 | |
| DATED | : December 28, 2010 | |
| INVENTOR(S) | : Robert DeFrance | |

It is certified that error appears in the above-identified patent and that said Letters Patent is hereby corrected as shown below:

Claim 9, col. 6, line 19 insert --a-- after "with".

Signed and Sealed this
Eighth Day of March, 2011

David J. Kappos
*Director of the United States Patent and Trademark Office*